US009676929B2

(12) United States Patent
Brothers et al.

(10) Patent No.: US 9,676,929 B2
(45) Date of Patent: Jun. 13, 2017

(54) EMPLOYING POLYALKYLENE OXIDES FOR NUCLEATION IN AQUEOUS POLYMERIZATION OF FLUOROMONOMER

(71) Applicant: THE CHEMOURS COMPANY FC LLC, Wilmington, DE (US)

(72) Inventors: Paul Douglas Brothers, Chadds Ford, PA (US); Subhash Vishnu Gangal, Hockessin, DE (US); Dipti Dilip Khasnis, Wilmington, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 0 days.

(21) Appl. No.: 14/552,610

(22) Filed: Nov. 25, 2014

(65) Prior Publication Data
US 2015/0148481 A1 May 28, 2015

Related U.S. Application Data

(60) Provisional application No. 61/908,768, filed on Nov. 26, 2013.

(51) Int. Cl.
*C08L 27/18* (2006.01)
*C08F 2/18* (2006.01)
*C08F 14/18* (2006.01)
*C08F 14/26* (2006.01)

(52) U.S. Cl.
CPC .............. *C08L 27/18* (2013.01); *C08F 2/18* (2013.01); *C08F 14/18* (2013.01); *C08F 14/26* (2013.01)

(58) Field of Classification Search
CPC .. C08L 27/18; C08F 2/18; C08F 14/18; C08F 14/26
USPC .................................................. 524/742, 805
See application file for complete search history.

(56) References Cited

U.S. PATENT DOCUMENTS

| | | |
|---|---|---|
| 2,559,752 A | 7/1951 | Berry |
| 3,009,892 A | 11/1961 | Duddington et al. |
| 3,037,953 A | 6/1962 | Marks et al. |
| 3,271,341 A | 9/1966 | Garrison, Jr. |
| 3,282,875 A | 11/1966 | Connolly et al. |
| 3,391,099 A | 7/1968 | Punderson |
| 3,859,262 A | 1/1975 | Hartwimmer |
| 4,036,802 A | 7/1977 | Poirier |
| 4,098,978 A | 7/1978 | Mikofalvy et al. |
| 4,342,675 A | 8/1982 | Gangal |
| 4,358,545 A | 11/1982 | Ezzell et al. |
| 4,380,618 A | 4/1983 | Khan et al. |
| 4,463,144 A | 7/1984 | Kojima et al. |
| 4,552,631 A | 11/1985 | Bissot et al. |
| 4,621,116 A | 11/1986 | Morgan |
| 4,940,525 A | 7/1990 | Ezzell et al. |
| 5,530,078 A | 6/1996 | Felix et al. |
| 5,637,748 A | 6/1997 | Hung et al. |
| 5,703,185 A | 12/1997 | Blair |
| 5,763,552 A | 6/1998 | Feiring et al. |
| 5,925,705 A | 7/1999 | Araki et al. |
| 5,959,026 A | 9/1999 | Abusleme et al. |
| 6,177,196 B1 | 1/2001 | Brothers et al. |
| 6,300,445 B1 | 10/2001 | Hung et al. |
| 6,395,848 B1 | 5/2002 | Morgan et al. |
| 6,512,063 B2 | 1/2003 | Tang |
| 6,841,616 B2 | 1/2005 | Wille et al. |
| 6,869,997 B2 | 3/2005 | Wille et al. |
| 7,064,170 B2 | 6/2006 | Kaspar et al. |
| 7,074,862 B2 | 7/2006 | Kaspar et al. |
| 7,122,610 B2 | 10/2006 | Wille et al. |
| 7,521,513 B2 | 4/2009 | Tang |
| 7,566,762 B2 | 7/2009 | Otsuka et al. |
| 7,705,074 B2 | 4/2010 | Brothers et al. |
| 7,709,566 B2 | 5/2010 | Hoshikawa et al. |
| 7,728,087 B2 | 6/2010 | Hintzer et al. |
| 7,763,680 B2 | 7/2010 | Aten et al. |
| 7,851,573 B2 | 12/2010 | Higuchi et al. |
| 7,855,259 B2 | 12/2010 | Funaki et al. |
| 7,897,682 B2 | 3/2011 | Brothers et al. |
| 7,977,438 B2 | 7/2011 | Brothers et al. |
| 8,080,621 B2 | 12/2011 | Amin-Sanayei et al. |
| 8,158,734 B2 | 4/2012 | Amin-Sanayei et al. |

(Continued)

FOREIGN PATENT DOCUMENTS

| | | |
|---|---|---|
| CA | 878571 A | 8/1971 |
| GB | 1 299 520 A | 12/1972 |
| JP | 2004-4359870 A | 12/2004 |
| WO | 2008/019155 A1 | 2/2008 |
| WO | 2009/013214 A1 | 1/2009 |
| WO | 2009/126504 A2 | 10/2009 |
| WO | 2012/030784 A1 | 3/2012 |
| WO | 2012/125788 A2 | 9/2012 |

OTHER PUBLICATIONS

BASF Corporation Technical Bulletin Pluronic 31R1 (2004).*
B. Trathnigg, Determination of chemical composition of polymers by size-exclusion chromatography with coupled density and refractive index detection, III. Polyethylene oxide and polytetrahydrofuran, Journal of Chormatography, 1991, pp. 507-516, vol. 552, Elsevier Science Publishers B.V., Amsterdam.

(Continued)

*Primary Examiner* — Kelechi Egwim

(57) ABSTRACT

Process for polymerizing fluoromonomer to form an aqueous dispersion of fluoropolymer particles including: (a) providing an aqueous medium in a polymerization reactor, (b) adding nucleating additive comprising polyalkylene oxide having a number average molecular weight of about 50 to about 2000 to the aqueous medium in an amount of about 0.1 ppm to about 50 ppm based on water in the aqueous medium, (c) exposing the nucleating additive to oxidizing agent to form a dispersion of oleophilic nucleation sites in the aqueous medium; (d) pressurizing the reactor by adding fluoromonomer, and (e) adding polymerization initiator to the aqueous medium to cause the polymerizing of the fluoromonomer to form fluoropolymer particles dispersed in the aqueous medium.

17 Claims, No Drawings

(56) References Cited

U.S. PATENT DOCUMENTS

| | | |
|---|---|---|
| 8,338,518 B2 | 12/2012 | Amin-Sanayei et al. |
| 8,563,670 B2 | 10/2013 | Brothers et al. |
| 8,735,492 B2 | 5/2014 | Imoto et al. |
| 8,765,890 B2 | 7/2014 | Amin-Sanayei et al. |
| 2005/0090613 A1 | 4/2005 | Maruya et al. |
| 2006/0128872 A1 | 6/2006 | Zipplies et al. |
| 2006/0281845 A1 | 12/2006 | Amin-Sanayei et al. |
| 2006/0281946 A1 | 12/2006 | Morita et al. |
| 2007/0015864 A1 | 1/2007 | Hintzer et al. |
| 2007/0015865 A1 | 1/2007 | Hintzer et al. |
| 2007/0015866 A1 | 1/2007 | Hintzer et al. |
| 2007/0032591 A1 | 2/2007 | Durali et al. |
| 2007/0082993 A1 | 4/2007 | Amin-Sanayei et al. |
| 2007/0135546 A1 | 6/2007 | Amin-Sanayei et al. |
| 2007/0149733 A1 | 6/2007 | Otsuka et al. |
| 2007/0270534 A1 | 11/2007 | Amin-Sanayei et al. |
| 2007/0282044 A1 | 12/2007 | Cavanaugh et al. |
| 2008/0114121 A1 | 5/2008 | Brothers et al. |
| 2008/0114143 A1 | 5/2008 | Brothers et al. |
| 2008/0125558 A1 | 5/2008 | Tang |
| 2008/0146757 A1 | 6/2008 | Lyons |
| 2008/0207859 A1 | 8/2008 | Matsuoka et al. |
| 2008/0262177 A1 | 10/2008 | Lyons |
| 2009/0221776 A1 | 9/2009 | Durali et al. |
| 2010/0160490 A1 | 6/2010 | Leffew et al. |
| 2012/0116003 A1* | 5/2012 | Brothers ............... C08F 14/18 524/394 |
| 2012/0116017 A1* | 5/2012 | Brothers ............... C08F 14/18 524/805 |
| 2012/0157656 A1 | 6/2012 | Yoneda et al. |

OTHER PUBLICATIONS

Paul H. Kasai, Perfluoropolyethers with Acid End Groups: Amphiphilicity and Emulsification, Journal of Applied Polymer Science, 1995, pp. 797-809, vol. 57, John Wiley & Sons, Inc.

Martin S. Silberberg, Chemistry: The Molecular Nature of Matter and Change, Periodic table on back of front cover, Fifth Edition, 2009, published by McGraw-Hill Higher Education.

Sina Ebnesajjad, Fluoroplastics, vol. 2: Melt Processible Fluoropolymers, The Definitive User's Guide and Databook, 2003, p. 27, Plastics Design Library.

Emulsion Polymerization of Acrylic Monomers, May 1996, Published by Rohm and Haas Company, Philadelphia, PA.

\* cited by examiner

… (1)

EMPLOYING POLYALKYLENE OXIDES FOR NUCLEATION IN AQUEOUS POLYMERIZATION OF FLUOROMONOMER

FIELD OF THE INVENTION

This invention relates to the polymerization of fluoromonomer to produce fluoropolymer and more particularly to use of polyalkylene oxide as a nucleating additive in the aqueous dispersion polymerization of fluoropolymer to produce a dispersion of fluoropolymer particles.

BACKGROUND OF THE INVENTION

U.S. Pat. No. 8,080,621 (Amin-Sanayei et al.); U.S. Pat. No. 8,158,734 (Amin-Sanayei et al.); and U.S. Pat. No. 8,338,518 (Amin-Sanayei et al.) disclose aqueous dispersion processes for making vinylidene fluoride polymers by employing materials in the aqueous medium, characterized in the patents as emulsifiers, which contain segments of polyethylene glycol, polypropylene glycol and/or polytetramethylene glycol. The materials have a variety of molecular weights and structures. For example, polyethylene glycol (PEG), polypropylene glycol (PPG) or polytetramethylene glycol (PTMG), with and without end group substitutions, are used. Compounds are also used in the process which contain blocks of both PEG and PPG such as the nonionic surfactants sold by BASF as Pluronic® 31R1, Pluronic® 25R2, and Pluronic® L101. In addition, the nonionic octylphenol ethoxylate surfactant sold by Dow Chemical as Triton X-100 is illustrated. If it is attempted to use the disclosed processes for making other types of fluoropolymers such as perfluoropolymers, e.g., polytetrafluoroethylene (PTFE) homopolymer or tetrafluoroethylene (TFE) copolymers such as FEP (hexafluororpropylene comonomer) or PFA (perfluoroalkyl vinyl ether comonomer), very little or no fluoropolymer dispersion is produced and instead the process results in high amounts of undispersed polymer (coagulum) which typically must be discarded as waste.

SUMMARY OF THE INVENTION

The present invention provides a process for polymerizing fluoromonomer to form an aqueous dispersion of fluoropolymer particles. The process includes the steps of:
  (a) providing an aqueous medium in a polymerization reactor,
  (b) adding nucleating additive comprising polyalkylene oxide having a number average molecular weight of about 50 to about 2000 to the aqueous medium in an amount of about 0.1 ppm to about 50 ppm based on water in the aqueous medium,
  (c) exposing the nucleating additive to oxidizing agent to form a dispersion of oleophilic nucleation sites in the aqueous medium;
  (d) pressurizing the reactor by adding fluoromonomer, and
  (e) adding polymerization initiator to the aqueous medium to cause the polymerizing of the fluoromonomer to form fluoropolymer particles dispersed in the aqueous medium.

DETAILED DESCRIPTION OF THE INVENTION

Fluoromonomer/Fluoropolymer

The process of the invention polymerizes fluoromonomer in an aqueous medium to form an aqueous dispersion of fluoropolymer particles. By "fluoromonomer" is meant a monomer which contains fluorine, preferably an olefinic monomer with at least one fluorine or a fluoroalkyl group attached to a doubly-bonded carbon. Other monomers can be employed in the polymerization which are not fluorinated.

The fluoromonomer and the fluoropolymer obtained therefrom each preferably contain at least 35 wt % fluorine, more preferably at least 50 wt % fluorine. Preferred fluoromonomers useful to produce fluoropolymers in accordance with the invention may be selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether) and mixtures thereof. A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro(methyl vinyl ether) (PMVE). Non-fluorinated olefinic comonomers such as ethylene and propylene can be copolymerized with the fluoromonomers.

Fluorovinyl ethers also include those useful for introducing functionality into fluoropolymers. These include $CF_2=CF-(O-CF_2CFR_f)_a-O-CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2=CF-O-CF_2CF(CF_3)-O-CF_2CF_2SO_2F$, perfluoro(3,6-dioxa-4-methyl-7-octenesulfonyl fluoride)), and in U.S. Pat. Nos. 4,358,545 and 4,940,525 ($CF_2=CF-O-CF_2CF_2SO_2F$). Another example is $CF_2=CF-O-CF_2-CF(CF_3)-O-CF_2CF_2CO_2CH_3$, methyl ester of perfluoro(4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

In a preferred process in accordance with the invention, the process produces a dispersion of perfluoropolymer particles. By "perfluoropolymer" is meant that the monovalent substituents on the carbon atoms forming the chain or backbone of the polymer are all fluorine atoms, with the exception of C—H moiety resulting from minor amounts of comonomer or C—H moiety in end groups or pendant group structure. Preferably, the comonomer, end group, or pendant group structure will impart no more than 2 wt % C—H moiety, more preferably no greater than 1 wt % C—H moiety, with respect to the total weight of the perfluoropolymer. Preferably, the hydrogen content, if any, of the perfluoropolymer is no greater than 0.2 wt %, based on the total weight of the perfluoropolymer. A preferred group of perfluoropolymers are selected from polytetrafluoroethylene, modified polytetrafluoroethyene, and melt-fabricable copolymer comprising 40-99 mol % tetrafluoroethylene units and 1-60 mol % of at least one other fluoromonomer.

The process is especially useful for making polytetrafluoroethylene (PTFE) (including modified PTFE) dispersions. Polytetrafluoroethylene (PTFE) refers to (a) the polymerized tetrafluoroethylene by itself without any significant comonomer present, i.e. homopolymer and (b) modified PTFE, which is a copolymer of TFE having such small concentrations of comonomer that the melting point of the resultant polymer is not substantially reduced below that of PTFE. The modified PTFE contains a small amount of comonomer modifier which reduces crystallinity to improve film forming capability during baking (fusing). Examples of such monomers include perfluoroolefin, notably hexafluoropropylene (HFP) or perfluoro(alkyl vinyl ether) (PAVE), where the alkyl group contains 1 to 5 carbon atoms, with perfluoro (methyl vinyl ether) (PMVE), perfluoro(ethyl vinyl ether) (PEVE) and perfluoro(propyl vinyl ether) (PPVE) being preferred, chlorotrifluoroethylene (CTFE), perfluorobutyl ethylene (PFBE), or other monomer that introduces bulky side groups into the polymer molecule. The concentration of such comonomer is preferably less than 1 wt %, more preferably less than 0.5 wt %, based on the total weight of the TFE and comonomer present in the PTFE. A minimum amount of at least about 0.05 wt % is preferably used to have significant effect. PTFE (and modified PTFE) typically have a melt creep viscosity of at least about $1 \times 10^6$ Pa·s and preferably at least $1 \times 10^8$ Pa·s and, with such high melt viscosity, the polymer does not significantly flow in the molten state and therefore is not a melt-processible polymer. The measurement of melt creep viscosity is disclosed in col. 4 of U.S. Pat. No. 7,763,680. The high melt viscosity of PTFE arises from is extremely high molecular weight (Mn), e.g. at least $10^6$. PTFE can also be characterized by its high melting temperature, of at least 330° C., upon first heating. The non-melt flowability of the PTFE, arising from its extremely high melt viscosity, results in a no melt flow condition when melt flow rate (MFR) is measured in accordance with ASTM D 1238 at 372° C. and using a 5 kg weight, i.e., MFR is 0. The high molecular weight of PTFE is characterized by measuring its standard specific gravity (SSG). The SSG measurement procedure (ASTM D 4894, also described in U.S. Pat. No. 4,036,802) includes sintering of the SSG sample free standing (without containment) above its melting temperature without change in dimension of the SSG sample. The SSG sample does not flow during the sintering.

The process of the present invention is also useful for making low molecular weight PTFE, which is commonly known as PTFE micropowder to distinguish from PTFE described above which has significantly higher molecular weight. The molecular weight of PTFE micropowder is low relative to PTFE, i.e. the molecular weight (Mn) is generally in the range of $10^4$ to $10^5$. The result of this lower molecular weight of PTFE micropowder is that it has fluidity in the molten state, in contrast to PTFE which is not melt flowable. PTFE micropowder has melt flowability, which can be characterized by a melt flow rate (MFR) of at least 0.01 g/10 min, preferably at least 0.1 g/10 min and more preferably at least 5 g/10 min, and still more preferably at least 10 g/10 min., as measured in accordance with ASTM D 1238, at 372° C. using a 5 kg weight on the molten polymer.

The invention is also useful for making melt-processible fluoropolymers that are also melt-fabricable. Melt-processible means that the fluoropolymer can be processed in the molten state, i.e., fabricated from the melt using conventional processing equipment such as extruders and injection molding machines, into shaped articles such as films, fibers, and tubes. Melt-fabricable means that the resultant fabricated articles exhibit sufficient strength and toughness to be useful for their intended purpose. This sufficient strength may be characterized by the fluoropolymer by itself exhibiting an MIT Flex Life of at least 1000 cycles, preferably at least 2000 cycles, measured as disclosed in U.S. Pat. No. 5,703,185. The strength of the fluoropolymer is indicated by it not being brittle.

Examples of such melt-processible fluoropolymers include homopolymers such as polychlorotrifluoroethylene and polyvinylidene fluoride (PVDF) or copolymers of tetrafluoroethylene (TFE) and at least one fluorinated copolymerizable monomer (comonomer) present in the polymer usually in sufficient amount to reduce the melting point of the copolymer substantially below that of PTFE, e.g., to a melting temperature no greater than 315° C.

A melt-processible TFE copolymer typically incorporates an amount of comonomer into the copolymer in order to provide a copolymer which has a melt flow rate (MFR) of 0.1 to 200 g/10 min as measured according to ASTM D-1238 using a 5 kg weight on the molten polymer and the melt temperature which is standard for the specific copolymer. MFR will preferably range from 1 to 100 g/10 min, most preferably about 1 to about 50 g/10 min. Additional melt-processible fluoropolymers are the copolymers of ethylene (E) or propylene (P) with TFE or CTFE, notably ETFE and ECTFE.

A preferred melt-processible copolymer for the practice of the present invention comprises at least 40-99 mol % tetrafluoroethylene units and 1-60 mol % of at least one other monomer. Additional melt-processible copolymers are those containing 60-99 mol % TFE units and 1-40 mol % of at least one other monomer. Preferred comonomers with TFE to form perfluoropolymers are perfluoromonomers, preferably perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PMVE, PEVE and/or PPVE, MFA (TFE/PMVE/PAVE wherein the alkyl group of PAVE has at least two carbon atoms) and THV (TFE/HFP/VF$_2$).

All these melt-processible fluoropolymers can be characterized by MFR as recited above for the melt-processible TFE copolymers, i.e. by the procedure of ASTM 1238 using standard conditions for the particular polymer, including a 5 kg weight on the molten polymer in the plastometer for the MFR determination of PFA and FEP Further useful polymers are film forming polymers of polyvinylidene fluoride (PVDF) and copolymers of vinylidene fluoride as well as polyvinyl fluoride (PVF) and copolymers of vinyl fluoride.

The invention is also useful for making fluorocarbon elastomers (fluoroelastomers). These elastomers typically have a glass transition temperature below 25° C. and exhibit little or no crystallinity at room temperature and little or no melting temperature. Fluoroelastomer made by the process of this invention typically are copolymers containing 25 to 75 wt %, based on total weight of the fluoroelastomer, of copolymerized units of a first fluoromonomer which may be vinylidene fluoride (VF$_2$) or tetrafluoroethylene (TFE). The remaining units in the fluoroelastomers are comprised of one or more additional copolymerized monomers, different from the first monomer, selected from the group consisting of fluoromonomers, hydrocarbon olefins and mixtures thereof. Fluoroelastomers may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluoroelastomer copolymers include TFE/PMVE, TFE/PMVE/E, TFE/P and TFE/P/VF$_2$. Preferred VF$_2$ based fluorocarbon elastomer copolymers include VF$_2$/HFP, VF$_2$/HFP/TFE, and VF$_2$/PMVE/TFE. Any of these elastomer copolymers may further comprise units of cure site monomer.

Polyalkylene Oxides

Polyalkylene oxide is employed as a nucleating additive in the polymerization process of the present invention. By "polyalkylene oxide" is meant an oligomeric compound or mixtures of oligomeric compounds having oligomeric alkylene oxide segments such as polymethylene oxide, polyethylene oxide, polypropylene oxide, and polytetramethylene oxide. More than one type of segment can be present in a polyalkylene oxide useful for the practice of the present invention. Preferably, polyalkylene oxides are employed which have only one type of segment. Polyalkylene oxides may contain oligomeric compounds with differing molecular weights and most commercially available materials are sold as mixtures of compounds having a stated average molecular weight and thus contain compounds with a distribution of molecular weights around the average. Mixtures of compounds with greater differences in molecular weights or entirely different chemical compositions may be employed if desired by mixing different polyalkylene oxides.

The polyalkylene oxides may be terminated with any of a wide variety of end groups and the end groups in a particular compound may be the same or different. Preferably, the end groups do not have a polarity significantly different from the polyalkylene oxide segments, i.e., do not confer enough hydrophobicity or hydrophilicity relative to the polyalkylene oxide segments to make the compounds useful as surfactants for the stabilization of fluoropolymer particles since they do not sufficiently reduce the surface tension of water. Preferred nucleating additives have a surface tension in water at a concentration of 1000 ppm of greater than about 40 dynes/cm, more preferably greater than about 42, dynes/cm and most preferably greater than about 45 dynes/cm. The nucleating additives typically decrease the surface tension of water to some extent but the upper limit of surface tension of nucleating additives in water can approach that of pure water, i.e., ~73 dynes/cm at a concentration of 1000 ppm.

The nucleating additive employed in accordance with the present invention has a number average molecular weight of about 50 to about 2000. Preferably, the nucleating additive has a number average molecular weight of about 100 to about 1500, most preferably about 150 to about 1300.

Preferred nucleating additives for use in process of the present invention are compounds of the formula:

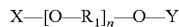

wherein R$_1$ is a branched or unbranched alkylene group having 1-4 carbon atoms; X and Y are independently selected from hydrogen, alkyl having 1 to 5 carbon atoms, acrylate, and methacrylate; and n is 1 to 50. For example, compounds with R$_1$ being ethylene and X and Y being H are typically referred to as polyethylene glycol (PEG) and are commercially available as mixtures with a variety of molecular weights from a number of suppliers. Examples of other commercially available polyalkylene oxides useful in the practice of the invention are polyethylene glycol acrylate (PEGA), polyethylene glycol methacrylate (PEGMA), polyethylene glycol methyl ether (PEGME), polyethylene glycol dimethyl ether (PEGDME), polyethylene glycol butyl ether (PEGBE), polypropylene glycol (PPG), polypropylene glycol acrylate (PPGA), polypropylene glycol methacrylate (PPGMA), polypropylene glycol dimethacrylate (PPGDMA), polypropylene glycol methyl ether (PPGME), polypropylene glycol dimethyl ether (PPGDME), polypropylene glycol butyl ether (PPGBE), polypropylene glycol dimethacrylate (PPGDMA), and polytetramethylene glycol (PTMG).

Stabilizing Surfactants

In a preferred form of the process of the invention, surfactant is added to the aqueous medium to stabilize said dispersion of fluoropolymer particles. Any of a variety of surfactant types can be used including halogen-containing surfactants, e.g., fluorosurfactant, and hydrocarbon-containing surfactants. By "hydrocarbon-containing surfactant" is meant that at least some of the monovalent substituents on the carbon atoms are hydrogen and substitutions by halogen, such as fluorine or chlorine, are also possible. In preferred hydrocarbon-containing surfactants, at least 75%, preferably at least 85%, and more preferably at least 95% of the monovalent substitutions are hydrogen.

Preferred hydrocarbon-containing surfactants are hydrocarbon surfactants and siloxane surfactants. By "hydrocarbon surfactant" is meant a surfactant which does not contain silicon and which has 100% of the monovalent substituents on the carbon atoms being hydrogen and thus is free of halogen such as chlorine and fluorine.

By "siloxane surfactant" is meant hydrocarbon-containing surfactant having a hydrophobic group including a siloxane backbone comprising a number of siloxane units.

Fluorosurfactants which can be used are described in U.S. Pat. No. 6,395,848 to Morgan et al. as fluoroalkyl having at most one ether oxygen, preferably perfluoroalkyl, carboxylic acids and salts thereof having 6-20 carbon atoms, preferably 6-12 carbon atoms, such as ammonium perfluorooctanoate and ammonium perfluorononanoate (see Berry, U.S. Pat. No. 2,559,752). Perfluoroalkyl sulfonic acids and salts may also be used such as perfluoroalkyl ethane sulfonic acids and salts thereof, e.g., a compound or a mixture of compounds of the formula F—(—CF$_2$—CF$_2$—)$_n$—CH$_2$CH$_2$—SO$_3$M, wherein n is 2-8 and M is a cation having a valence of 1 as described in Khan & Morgan, U.S. Pat. No. 4,380,618.

Additional examples of useful fluorosurfactants include perfluoroalkoxy benzene sulfonic acids and salts thereof wherein the perfluoroalkyl component of the perfluoroalkoxy has 4-12 carbon atoms, preferably 7-12 carbon atoms (as described in Morgan, U.S. Pat. No. 4,621,116). Additional examples of such surfactants also include partially-fluorinated surfactants having internal methylene groups and having the formula R$_f$—(CH$_2$)$_m$—R'$_f$—COOM wherein m is 1-3, R$_f$ is perfluoroalkyl or perfluoroalkoxy containing 3-8 carbon atoms, R'$_f$ is linear or branched perfluoroalkylene containing 1-4 carbon atoms, and M is NH$_4$, Li, Na, K, or H (as described in Feiring et al., U.S. Pat. No. 5,763,552).

One preferred type of fluorosurfactant is fluoroether surfactant. Examples of suitable fluoroether surfactants have been described in U.S. Pat. No. 3,271,341 to Garrison; U.S. Patent Publications 2007/0015864, 2007/0015865, and 2007/0015866 to Hintzer et al.; U.S. Patent Publications 2005/0090613 to Maruya et al. and 2006/0281946 to Morita et al.; PCT Patent Publications WO 2007046345 to Higuchi et al., 2007046377 to Funaki et al., 2007046482 to Hoshikawa et al., and 2007/049517 to Matsuoka et al.

Another preferred type of fluorosurfactant is defined as a short chain fluorosurfactant in WO2008/060461 to Brothers et al.

Examples of hydrocarbon-containing surfactants useful in the present invention in which only a minor number of monovalent substituents on carbon atoms are fluorine instead of hydrogen are the PolyFox® surfactants available from Omnova Solutions, Inc., described below.

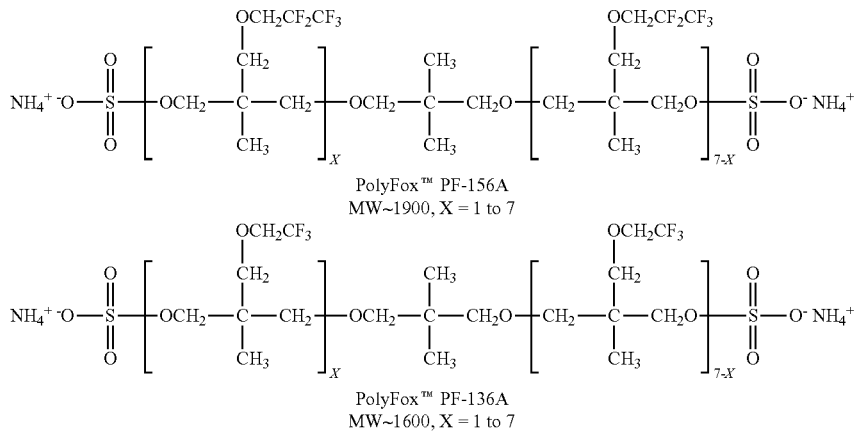

PolyFox™ PF-156A
MW~1900, X = 1 to 7

PolyFox™ PF-136A
MW~1600, X = 1 to 7

Suitable siloxane surfactants have been described in U.S. Pat. No. 6,841,616 to Wille et al. and in U.S. Pat. No. 7,977,438 to Brothers et al.

In a preferred form of the process of the invention, the stabilizing surfactant is hydrocarbon surfactant. The hydrocarbon surfactant employed is preferably anionic hydrocarbon surfactant. By "anionic hydrocarbon surfactant" is meant a hydrocarbon surfactant which has a negatively charged hydrophilic portion such as a carboxylate, sulfonate, sulfate, phosphonate or phosphate group and a hydrocarbon portion, such as alkyl, as the hydrophobic portion.

One example of an anionic hydrocarbon surfactant is the highly branched C10 tertiary carboxylic acid supplied as Versatic® 10 by
Resolution Performance Products

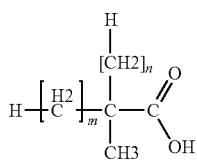

Versatic® 10
Neodecanoic acid (n+m = 7)

Another useful anionic hydrocarbon surfactant is the sodium linear alkyl polyether sulfonates supplied as the Avanel® S series by BASF. The ethylene oxide chain provides nonionic characteristics to the surfactant and the sulfonate groups provide certain anionic characteristics.

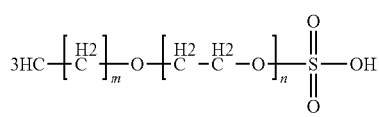

Avanel®
S-70 (n = 7, m = 11-14)
S-74 (n = 3, m = 8)

Another group of anionic hydrocarbon surfactants are those anionic surfactants represented by the formula R-L-M wherein R is an alkyl group, preferably straight chain, containing from 6 to 17 carbon atoms, L is selected from the group consisting of —$ArSO_3^-$, —$SO_3^-$, —$SO_4^-$, —$PO_3^-$, —$PO_4^-$ and —$COO^-$, and M is a univalent cation, preferably $H^+$, $Na^+$, $K^+$ and $NH_4^+$, or mixtures thereof. —$ArSO_3^-$ is aryl sulfonate. Preferred of these surfactants are those represented by the formula $CH_3$—$(CH_2)_n$-L-M, wherein n is an integer of 6 to 17 and L is selected from —$SO_4M$, —$PO_3M$, —$PO_4M$, or —COOM and L and M have the same meaning as above. Especially preferred are R-L-M surfactants wherein the R group is an alkyl group having 12 to 16 carbon atoms and wherein L is sulfate, and mixtures thereof. Especially preferred of the R-L-M surfactants is sodium dodecyl sulfate (SDS). For commercial use, SDS (sometimes referred to as sodium lauryl sulfate or SLS), is typically obtained from coconut oil or palm kernel oil feedstocks, and contains predominately sodium dodecyl sulfate but may contain minor quantities of other R-L-M surfactants with differing R groups. "SDS" as used in this application means sodium dodecyl sulfate or surfactant mixtures which are predominantly sodium docecyl sulphate containing minor quantities of other R-L-M surfactants with differing R groups.

Another example of anionic hydrocarbon surfactant useful in the present invention is the sulfosuccinate surfactant Lankropol® K8300 available from Akzo Nobel Surface Chemistry LLC. The surfactant is reported to be the following:

Butanedioic acid, sulfo-, 4-(1-methyl-2-((1-oxo-9-octadecenyl)amino)ethyl)ester, disodium salt; CAS No.:67815-88-7

Additional sulfosuccinate hydrocarbon surfactants useful in the present invention are diisodecyl sulfosuccinate, Na salt, available as Emulsogen® SB10 from Clariant, and diisotridecyl sulfosuccinate, Na salt, available as Polirol® TR/LNA from Cesapinia Chemicals.

Another preferred class of hydrocarbon surfactants is nonionic hydrocarbon surfactant. A nonionic hydrocarbon surfactant does not contain a charged group but has a hydrophobic portion that is often is a long chain hydrocarbon. The hydrophilic portion of the nonionic surfactant typically contains water soluble functionality such as a chain of ethylene ether derived from polymerization of ethylene oxide. Rather than this structure, some nonionic surfactants are block copolymers with polyalkylene oxide blocks of different types, e.g., polyethylene oxide and polypropylene oxide.

Nonionic hydrocarbon surfactants include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, their derivatives and the like. More specifically examples of polyoxyethylene alkyl ethers are polyoxyethylene lauryl ether, polyoxyethylene cetyl ether, polyoxyethylene stearyl ether, polyoxyethylene oleyl ether, polyoxyethylene behenyl ether and the like; examples of polyoxyethylene alkyl phenyl ethers are polyoxyethylene nonyl phenyl ether, polyoxyethylene octyl phenyl ether and the like; examples of polyoxyethylene alkyl esters are polyethylene glycol monolaurylate, polyethylene glycol monooleate, polyethylene glycol monostearate and the like; examples of sorbitan alkyl esters are polyoxyethylene sorbitan monolaurylate, polyoxyethylene sorbitan monopalmitate, polyoxyethylene sorbitan monostearate, polyoxyethylene sorbitan monooleate and the like; examples of polyoxyethylene sorbitan alkyl esters are polyoxyethylene sorbitan monolaurylate, polyoxyethylene sorbitan monopalmitate, polyoxyethylene sorbitan monostearate and the like; and examples of glycerol esters are glycerol monomyristate, glycerol monostearate, glycerol monooleate and the like. Also examples of their derivatives are polyoxyethylene alkyl amine, polyoxyethylene alkyl phenyl-formaldehyde condensate, polyoxyethylene alkyl ether phosphate and the like. Particularly preferable are polyoxyethylene alkyl ethers and polyoxyethylene alkyl esters. Examples of such ethers and esters are those that have an HLB value of 10 to 18. More particularly there are polyoxyethylene lauryl ether (EO: 5 to 20. EO stands for an ethylene oxide unit.), polyethylene glycol monostearate (EO: 10 to 55) and polyethylene glycol monooleate (EO: 6 to 10).

Suitable nonionic hydrocarbon surfactants include octyl phenol ethoxylates such as the Triton® X series supplied by Dow Chemical Company:

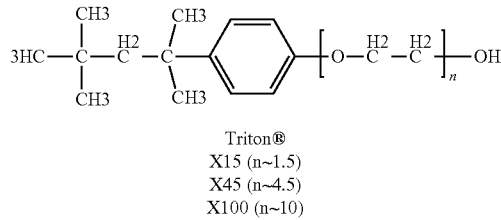

Triton®
X15 (n~1.5)
X45 (n~4.5)
X100 (n~10)

Preferred nonionic hydrocarbon surfactants are branched alcohol ethoxylates such as the Tergitol® 15-S series supplied by Dow Chemical Company and branched secondary alcohol ethoxylates such as the Tergitol® TMN series also supplied by Dow Chemical Company.:

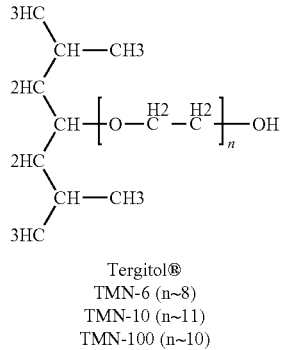

Tergitol®
TMN-6 (n~8)
TMN-10 (n~11)
TMN-100 (n~10)

Ethylene oxide/propylene oxide copolymers such as the Tergitol® L series surfactant supplied by Dow Chemical Company are also useful as nonionic surfactants in this invention.

Yet another useful group of suitable nonionic hydrocarbon surfactants are difunctional block copolymers supplied as Pluronic® R series from BASF, such as:

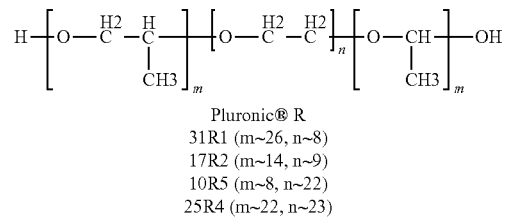

Pluronic® R
31R1 (m~26, n~8)
17R2 (m~14, n~9)
10R5 (m~8, n~22)
25R4 (m~22, n~23)

Another group of suitable nonionic hydrocarbon surfactants are tridecyl alcohol alkoxylates supplied as Iconol® TDA series from BASF Corporation.

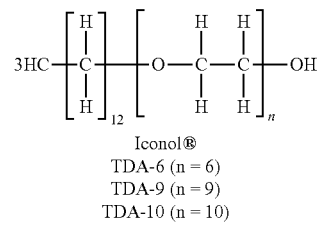

Iconol®
TDA-6 (n = 6)
TDA-9 (n = 9)
TDA-10 (n = 10)

Polymerization Process

The process of the invention may be carried out in a pressurized polymerization reactor suitable for producing an aqueous dispersion of fluoropolymer particles by polymerization of fluoromonomer. A batch or continuous process may be used although batch processes are more common for commercial production. The reactor is preferably equipped with a stirrer for the aqueous medium and the aqueous medium is preferably stirred throughout the polymerization. The reactor is also preferably equipped with a jacket surrounding the reactor so that the reaction temperature may be conveniently controlled by circulation of a controlled temperature heat exchange medium.

The aqueous medium provided in the polymerization reactor is preferably deionized and deaerated water. The temperature of the reactor and thus of the aqueous medium will preferably be from about 25 to about 120° C. For the production of PTFE homopolymers, paraffin wax is typically employed in the reactor as a stabilizer and the polymerization temperature employed will typically be above the melting point of the wax.

To cause the polymerization of fluoromonomer added to the reactor and form fluoropolymer particles in the aqueous medium, polymerization initiator is added to the aqueous medium. This is suitably accomplished using an aqueous solution of polymerization initiator which is pumped into the reactor in sufficient amount to cause commencement of the polymerization reaction which is frequently referred to in the art as the kick-off of the polymerization reaction. Kick-off is typically determined by a reduction in reactor pressure from its initial pressurization, e.g. by a pressure drop of 10 psi (69 kPa), indicating the commencement of fluoromonomer consumption in the polymerization process and thereby commencement of the polymerization reaction.

The polymerization initiator employed is preferably a water-soluble free-radical polymerization initiator. For polymerization of TFE to produce PTFE, preferred initiator is organic peracid such as disuccinic acid peroxide (DSP), which requires a large amount to cause kick-off, e.g. at least about 600 ppm, preferably together with a highly active initiator, such as inorganic persulfate salt such as ammonium persulfate in a smaller amount. For TFE copolymers such as FEP and PFA, inorganic persulfate salt such as ammonium persulfate is generally used. As is known in the art, the polymerization initiator added to cause kick-off can be supplemented by pumping additional initiator solution into the reactor as the polymerization reaction proceeds.

For the production of modified PTFE and for the production of TFE copolymers, relatively inactive fluoromonomer such as hexafluoropropylene (HFP) can already be present in the reactor prior to pressuring up with the more active TFE fluoromonomer. After kick-off, TFE is typically fed into the reactor to maintain the internal pressure of the reactor at the operating pressure. Additional comonomer such as HFP or perfluoro (alkyl vinyl ether) can be pumped into the reactor if desired. The aqueous medium should be adequately stirred to obtain a desired polymerization reaction rate and incorporation of comonomer, if present.

Chain transfer agents can be introduced into the reactor when molecular weight control is desired and they are typically employed in the production of melt-processable fluoropolymers. Preferred chain transfer agents include hydrogen, aliphatic hydrocarbons which may be cyclic, halocarbons, hydrohalocarbons or alcohol having 1 to 20 carbon atoms, more preferably 1 to 8 carbon atoms. Representative preferred examples of such chain transfer agents are alkanes such as ethane, chloroform, 1,4-diiodoperfluorobutane and methanol. The amount of a chain transfer agent and the mode of addition depend on the activity of the particular chain transfer agent and on the desired molecular weight of the polymer product. The amount of chain train transfer agent supplied to the polymerization reactor is preferably about 0.005 to about 5 wt %, more preferably from about 0.01 to about 2 wt % based upon the weight of the resulting fluoropolymer.

In a process in accordance with the invention, nucleating additive is added to the aqueous medium. As has been disclosed in more detail above, the nucleating additive comprises polyalkylene oxide having a number average molecular weight of about 50 to about 2000. The nucleating additive is added to the aqueous medium in an amount of about 0.1 ppm to about 50 ppm based on water in the aqueous medium. Preferably, the amount of nucleating additive is added in an amount of about 0.5 ppm to about 25 ppm based on water in the aqueous medium. Although other methods also can be used, it is preferred for the nucleating additive to be mixed with water prior to addition to the reactor and for the resulting solution or dispersion to be added to the aqueous medium and stirred at least after addition.

In a preferred embodiment of the process of the invention, the nucleating additive further comprises hydrocarbon-containing surfactant. Hydrocarbon-containing surfactant present in the aqueous medium in addition to the polyalkylene oxide can increase the number of particles formed during nucleation. Preferably, if hydrocarbon-containing surfactant is employed, the amount of hydrocarbon-containing surfactant is present in an amount of about 0.1 ppm to about 50 ppm based on water in the aqueous medium, more preferably, about 0.5 ppm to about 25 ppm based on water in the aqueous medium. Preferably, the hydrocarbon-containing surfactant is hydrocarbon surfactant, most preferably nonionic hydrocarbon surfactant. The nonionic hydrocarbon surfactants described above for use as a stabilizing surfactant can be used in combination with polyalkylene oxide in this embodiment of the invention. Nonionic hydrocarbon surfactant as part of the nucleating additive can be added to the aqueous medium before, together with, or after the addition of the polyalkylene oxide. Although other methods also can be used, it is preferred for the polyalkylene oxide and the nonionic hydrocarbon surfactant to both be mixed together in water prior to addition to the reactor and for the resulting solution or dispersion to be added to the aqueous medium and stirred at least after addition.

The nucleating additive is exposed to oxidizing agent to form a dispersion of oleophilic nucleation sites in the aqueous medium. By "dispersion of oleophilic nucleation sites" is meant chemical species that are formed and dispersed in the aqueous medium by the exposure of the polyalkylene oxide (and hydrocarbon-containing surfactant such as nonionic hydrocarbon surfactant, if present) to oxidizing agent and which have an affinity for and thereby attract the polymerizing polymer to form dispersed particles of fluoropolymer early in the polymerization.

For exposure of the nucleating additive to oxidizing agent, any of a variety of oxidizing agents can be used. It is preferred, however, to use a polymerization initiator as the oxidizing agent, most preferably, a polymerization initiator which is the same as a polymerization initiator as used to initiate polymerization in the process. Thus, preferred oxidizing agents are the highly active water-soluble salts of inorganic initiators such as the inorganic peracids which are well known for use as initiator in the polymerization of fluoromonomer. Most preferred oxidizing agents are the persulfate salts, e.g., ammonium persulfate or potassium persulfate. Preferred persulfate oxidizing agents are substantially free of metal ions and most preferably are ammonium salts.

Various methods can be used to expose the nucleating additive to oxidizing agent. An oxidizing agent which is the same or different from the polymerization initiator can be introduced into the aqueous medium by separate addition prior to the addition of polymerization initiator which begins the polymerization. For example, in a polymerization of TFE to make PTFE dispersion, ammonium persulfate (APS) solution can be added to the aqueous medium containing the nucleating additive with a later addition of a mixed solution containing APS and a longer half-life initiator such as disuccinic acid peroxide (DSP) to cause kick-off. The amount of oxidizing agent added separately for forming nucleation sites preferably provides an amount of oxidizing agent which is about 0.5 ppm to about 100 ppm based on water of the aqueous medium. Alternatively, when the oxidizing agent is the same as polymerization initiator which is to be pumped in an intermittent or continuous manner into the reactor during at least the first part of the polymerization, the early addition of initiator prior to polymerization kick-off exposes the nucleating additive to oxidizing agent to form the dispersion of oleophilic nucleation sites. The amount of oxidizing agent available for forming nucleation sites provided in the aqueous medium by continuous or intermittent addition is preferably about 0.5 ppm to about 100 ppm based on water of the aqueous medium. Continued intermittent or continuous addition of the same initiator solution results in kick-off. If desired, such as in a polymerization to produce PTFE dispersion, longer half-life initiators such as DSP can also be pumped into the reactor during the batch.

Prior to or during exposure of the nucleating additive to oxidizing agent, water-soluble inorganic salt preferably is added to the aqueous medium. The addition of water-soluble inorganic salt is useful to increase the number of fluoropolymer particles formed during nucleation. Preferred amounts of water-soluble inorganic salt are about 0.01 to about 80 ppm based on water in the aqueous medium, more preferably about 1 to about 50 ppm based on water in the aqueous medium. Suitable water-soluble inorganic salts include but are not limited to sodium sulfite, sodium bisulfite, sodium chloride, potassium sulfite, potassium bisulfite, potassium carbonate, ammonium oxalate, sodium tetraborate, sodium acetate, ammonium carbonate, ammonium phosphate monobasic, and ammonium phosphate dibasic. Preferred salts are sulfite salts, most preferably sodium or ammonium sulfite.

During or after the dispersion of oleophilic nucleation sites is formed, the reactor is pressurized by adding fluoromonomer, for example TFE, to the reactor. The reactor operating pressure is generally in the range of about 30 to about 1000 psig (0.3 to 7.0 MPa). For the purposes of decreasing batch time, pressurization of the reactor can be performed so that the time required for pressurizing the reactor overlaps partially or fully with the exposure of the nucleating additive to oxidizing agent to cause formation of oleophilic nucleation sites.

In a preferred process in accordance with the invention, surfactant is added to the aqueous medium to stabilize the dispersion of fluoropolymer particles. As has been discussed above, any of the various known types of surfactant can be used including halogen-containing surfactants, e.g., fluorosurfactant, and hydrocarbon-containing surfactants such as siloxane surfactant and hydrocarbon surfactant. Mixtures of surfactants including surfactants of different types can be used if desired.

For the practice of the present invention, hydrocarbon surfactant is preferably employed. Preferably for the practice of the present invention, no halogen-containing surfactant, such as fluorosurfactant, is added to the aqueous medium. Preferably, the aqueous medium during polymerization and the resulting dispersion contain less than about 50 ppm, and most preferably less than 10 ppm, of halogen-containing surfactant, based on the water in the aqueous medium.

When hydrocarbon-containing surfactant is employed, the addition of hydrocarbon-containing surfactant is preferably delayed until after polymerizing has commenced, i.e., until after kick-off. Hydrocarbon-containing surfactants, such as hydrocarbon surfactants, if present in significant quantity, e.g., in an amount suitable to stabilize the fluoropolymer particles in the dispersion upon batch completion, may interfere with the commencement of polymerization in the process of the invention and may delay or prevent kick-off entirely. It is more preferred to delay the addition of hydrocarbon-containing surfactant until after the concentration of said fluoropolymer particles in said aqueous medium is at least about 0.6 wt %.

It is also preferred for the hydrocarbon-containing surfactant to be added over time as polymerizing is carried out rather than being added at one time to the reactor. It is especially preferred for the hydrocarbon-containing surfactant to be fed into the reactor in a continuous manner as the polymerization proceeds, i.e., to be metered into the reactor. Preferred practices for hydrocarbon-containing surfactant addition which may be used in accordance with the present invention are more fully explained in U.S. Patent Publication US2012/0116003A1. The total amount of hydrocarbon-containing surfactant added to the aqueous fluoropolymer dispersion is preferably about 10 ppm to about 50,000 ppm, more preferably about 50 ppm to about 10,000 ppm, most preferably about 100 ppm to about 5000 ppm, based on fluoropolymer solids.

If desired, the hydrocarbon-containing surfactant such as hydrocarbon surfactant can be passivated prior to, during or after addition to the polymerization reactor. By "passivating" is meant to subject the hydrocarbon-containing surfactant to conditions or to a process which reduces the telogenic behavior of the hydrocarbon-containing surfactant. Passivation may be carried out by reacting said the hydrocarbon-containing surfactant with an oxidizing agent, preferably hydrogen peroxide or polymerization initiator. Preferably, the passivating of the hydrocarbon-containing surfactant is carried out in the presence of a passivation adjuvant, preferably transition metal ion, most preferably, iron or copper ion. Preferred practices for the passivation of hydrocarbon surfactants which may be used in a process of the present invention are more fully explained in U.S. Patent Publication US2012/0116003A1.

After completion of the polymerization when the desired amount of dispersed fluoropolymer solids content has been achieved (typically several hours in a batch process), the feeds are stopped, the reactor is vented, and the raw dispersion of fluoropolymer particles in the reactor is transferred to a cooling or holding vessel.

The solids content of the aqueous fluoropolymer dispersion as polymerized can range from about 10% by weight to up to about 65 wt % by weight but typically is about 20% by weight to 45% by weight. Particle size (Dv(50)) of the fluoropolymer particles in the aqueous fluoropolymer dispersion can range from 10 nm to 500 nm, preferably Dv(50) about 100 to about 400 nm.

In a preferred process of the invention, polymerizing produces less that about 10 wt %, more preferably less than 3 wt % undispersed fluoropolymer based on the total weight of fluoropolymer produced. Undispersed fluoropolymer (often referred to as coagulum) is fluoropolymer which does not remain in the aqueous medium as dispersed fluoropolymer particles and usually will remain inside the reactor or will be present in large particles which settle or are filtered out of the dispersion. Undispersed polymer typically must be discarded as waste.

For use in fluoropolymer coatings on materials such as metals, glass and fabric, PTFE dispersion is typically transferred to a dispersion concentration operation which produces stabilized dispersions useful as coatings or for addition to coating formulations. Typically, concentrated dispersions are stabilized with nonionic surfactants by known methods. The solids content of concentrated dispersion is typically about 35 to about 70 wt %.

Certain grades of PTFE dispersion are made for the production of fine powder. For this use as is known in the art, the dispersion is coagulated, the aqueous medium is removed and the PTFE is dried to produce fine powder.

For melt processible fluoropolymers such as FEP and PFA, methods well known in the art can be used to coagulate the dispersion and dry the fluoropolymer resin which is then typically processed into a convenient form such as chip or pellet for use in subsequent melt-processing operations.

TEST METHODS

Raw Dispersion Particle Size (RDPS) of polymer particles is measured using a Zetasizer Nano-S series dynamic light scattering system manufactured by Malvern Instruments of Malvern, Worcestershire, United Kingdom. Samples for analysis are diluted to levels recommended by the manufacturer in 10×10×45 mm polystyrene disposable cuvettes using deionized water that has been rendered substantially free of particles by passing it through a sub-micron filter. The sample is placed in the Zetasizer for determination of Dv(50). Dv(50) is the median particle size based on volumetric particle size distribution, i.e. the particle size below which 50% of the volume of the population resides.

The melting point ($T_m$) of melt-processible fluoropolymers is measured by Differential Scanning calorimeter (DSC) according to the procedure of ASTM D 4591-07 with the melting temperature reported being the peak temperature of the endotherm of the second melting. For PTFE homopolymer, the melting point is also determined by DSC. The unmelted PTFE homopolymer is first heated from room temperature to 380° C. at a heating rate of 10° C. and the melting temperature reported is the peak temperature of the endotherm on first melting.

Melt flow rate (MFR) of the melt-processible fluoropolymers are measured according to ASTM D 1238-10, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C., such as disclosed in ASTM D 2116-07 for FEP and ASTM D 3307-10 for PFA. Five minutes after the sample is charged to the cylinder, it is extruded through a 2.10 mm (0.0825 inch) diameter, 8.00 mm (0.315 inch) long square-edge orifice under a load (piston plus weight) of 5000 grams. Other fluoropolymers are measured according to ASTM D 1238-10 at the conditions which are standard for the specific polymer.

Comonomer (PPVE) Content in the melt processible TFE/PPVE copolymer is measured using a Fourier Transform Infrared (FTIR) spectrometer. Films are prepared by compression molding at approximately 350° C. to a thickness of approximately 0.05 mm and quenching in ambient temperature water. Thus prepared film is dried and mounted on a suitable support for the instrument. The supported film is placed into the FTIR instrument and allowed to equilibrate under a nitrogen atmosphere. The FTIR spectrum is collected and then measured to determine PPVE content as follows: The corrected absorbance at the peak near 994 $cm^{-1}$ is obtained by measuring the peak height from a baseline spanning 953 $cm^{-1}$ and 1038 $cm^{-1}$. The corrected absorbance of the peak near 2365 $cm^{-1}$ is obtained by measuring the peak height from a baseline spanning 2051 $cm^{-1}$ and 2783 $cm^{-1}$. The ratio of the corrected absorbance at 994 $cm^{-1}$ to the corrected absorbance at 2365 $cm^{-1}$ is calculated. This absorbance ratio is then used to determine PPVE content by means of a calibration curve established with reference films of known PPVE content. F19 NMR is used as the primary standard for establishing PPVE content of the reference films.

To determine the content of other comonomers, the test method for PPVE content may be adapted for use by measuring FTIR peak height appropriate for the comonomer. For example, the following table shows FTIR spectrum peaks which can be used for several well known comonomers.

| Comonomer | FTIR Spectrum Peak |
| --- | --- |
| PEVE | 1090 $cm^{-1}$ |
| PMVE | 890 $cm^{-1}$ |
| HFP | 984 $cm^{-1}$ |

Surface Tension measurements are made using the Kruess Tensiometer, K11-MK1. Surface tension data is the average of 10 data points taken by the instrument. Measurements are done at ambient temperature (23° C.). The surface tension is determined in water at a concentration of 1000 ppm.

Calculation of weight % fluoropolymer solids in aqueous medium, for example, when indicting the delay before adding stabilizing surfactant, is determined using the following equation:

Concentration of fluoropolymer in wt %=($[A \div (B+A)]\times 100$, wherein A is the weight of dispersed fluoropolymer formed before addition of the surfactant commences which is deemed to be equal to the amount of TFE fed and B is the weight of water in the polymerization reactor at the time stabilizing surfactant addition commences. When a comonomer is present, the following formula is used to determine weight of dispersed fluoropolymer: A=weight of TFE fed/ (1−weight fraction of comonomer in fluoropolymer). The water additions comprising B to the reactor may include dissolved ingredients such as initiator but, for simplicity, the water additions are each considered to be entirely of water, not taking into account the weight of the dissolved ingredient.

Number Average Molecular Weight of polyalkylene oxides is measured by size exclusion chromatography in accordance with the method disclosed in the following article: B. Trathnigg, Determination of chemical composition of polymers by size-exclusion chromatography with coupled density and refractive index detection III. Polyethylene oxide and polytetrahydrofuran. *Journal of Chromatography*, 552 (1991) 507-516.

TABLE A

| Polyalkylene oxides | | | | |
| --- | --- | --- | --- | --- |
| Acronym | Supplier | Supplier Name | Number Average MW | Surface Tension dynes/cm |
| PEG 600 | Sigma Aldrich | Poly (ethylene glycol) 600 | 600 | 66.57 |
| PEG 400 | Sigma Aldrich | Poly (ethylene glycol) 400 | 400 | 68.23 |
| PEG 200 | Sigma Aldrich | Poly (ethylene glycol) 200 | 200 | 69.37 |
| PEG 1000 | Dow | Carbowax ™ Polyethylene glycol 1000 | 1000 | 65.83 |
| MPEG 750 | Dow | Carbowax ™ Methoxy Polyethylene glycol 750 | 750 | 66.07 |
| MPEG 550 | Dow | Carbowax ™ Methoxy Polyethylene glycol 550 | 550 | 66.47 |
| PEGBE | Sigma Aldrich | Poly (ethylene glycol) butyl ether Mn 206 | 206 | 62.57 |
| PEGMA | Sigma Aldrich | Poly (ethylene glycol) methacrylate Mn 500 | 500 | 53.03 |
| PEGDME | Merck Millipore | Polyethylene glycol dimethyl ether 250 | 250 | 68.33 |
| PPG P400 | Sigma Aldrich | Polypropylene glycol P400 | 400 | 56.33 |
| PPG P1200 | Sigma Aldrich | Polypropylene glycol P1200 | 1200 | 39.57 |

TABLE A-continued

Polyalkylene oxides

| Acronym | Supplier | Supplier Name | Number Average MW | Surface Tension dynes/cm |
|---|---|---|---|---|
| PPG 17 | Dow | Polyglycol P1000TB | 1000 | 45.30 |
| PPGMA | Sigma Aldrich | Poly(propylene glycol) methacrylate Mn 375 | 375 | 43.23 |
| PPGA | Sigma Aldrich | Poly(propylene glycol) acrylate Mn 475 | 475 | 41.40 |
| PPG PT700 | Dow | Polyglycol PT 700 | 700 | 52.77 |
| PPG PT250 | Dow | Polyglycol PT 250 | 250 | 56.57 |

Typically, the polyalkylene oxide nucleation additives employed in accordance with the invention have surface tension values in water significantly higher than the surface tension values of surfactants typically used for the stabilization of fluoropolymer particles when measured under the same conditions.

Comparative Example—PTFE

A series of Comparative Examples are listed in Tables B and C following the teachings of the first set of examples described in U.S. Pat. No. 8,080,621 B2 (Amin-Sanayei et al.) at Column 8, lines 21-34 and Table 1 and Table 2, except that TFE is used instead of VF2/HFP. The results of these comparative examples indicate the inability to form significant amounts of dispersion using TFE as a fluoromonomer to make PTFE and instead the process results in the production of large amounts of undispersed polymer (coagulum) to be discarded as waste.

To a 12 liter, horizontally disposed, jacketed, stainless steel autoclave with a two blade agitator is added 6560 gm of deionized, deaerated water. To the autoclave is added an additional 500 gm of deionized, deaerated water containing various polyalkylene oxides in varying amounts to aqueous medium as reported in Tables B and C. The autoclave is sealed and placed under vacuum. The autoclave is raised to 30 psig (310 kPa) with nitrogen and then evacuated. The autoclave is pressured with nitrogen and evacuated two more times. The autoclave is then purged with TFE by raising the pressure to 30 psig (310 kPa) and venting to atmospheric pressure a total of three times. The agitator speed is set to 65 RPM and the reactor is heated to 90° C. 506 gm of TFE is charged to the reactor to bring the reactor pressure to 400 psig (2.86 MPa). At time zero, quantities of initiator solution containing 10 gm of ammonium persulfate (APS) per liter of deionized water are precharged to the reactor at 80 ml/min for Examples B1-B4 as reported in Table B; and quantities of initiator solution containing 10 gm of potassium persulfate (KPS) and 10 gm of sodium acetate per liter of deionized water are precharged to the reactor at 80 ml/min for Examples C1-C4 as reported in Table C. The initiator solution is then added at 2 ml/min for the duration of polymerization. The kick-off time (KO Time) for each Example as reported in Tables B and C is the time from the start of initiator injection to when the reactor pressure drops 10 psi (69 kPa) from the maximum pressure observed during injection of the initiator solution. Autoclave pressure is brought back to 400 psig (2.86 MPa) with TFE and maintained at that pressure for the duration of the polymerization. After the indicated time from kick-off reported as Batch Time in each of the tables, polymerization is stopped. For Comparative Examples B1-B3, the polymerization was stopped because the TFE feed rate dropped to zero gm/hr. For Comparative Example B4, polymerization was stopped because of a sudden increase in TFE feed rate indicating vapor phase polymerization as a result of excessive undispersed polymer. The amount of TFE is reported as Batch Size and the amount of initiator solution that has been added to the reactor is also reported. The agitator is stopped, the reactor is vented to atmospheric pressure and the dispersion is discharged. Upon cooling, the dispersion is filtered to remove undispersed polymer. The reactor is opened and all adhered polymer removed from the reactor. Reactor cleanout is combined with the filtered undispersed polymer. Total undispersed polymer (coagulum) is thus determined and reported in Tables B and C. The solids content of dispersion having dispersed PTFE particles is also reported.

One measure of productivity of the polymerization process is space-time-yield (STY) of the polymerization reaction. In STY, space is the volume of the reactor, time is the time from kick-off of the polymerization reaction until its completion, and yield is the weight of dispersed polymer formed. STY for the Comparative Examples is either 0 for no dispersion formed or extremely low when small amounts of dispersion are formed.

TABLE B

| Example # | Polyalkylene Oxide Name | Amount gm | ppm, water | Kick-off initiator, APS ml | Kick-off initiator, APS gm | KO Time min | Initiator added during polymerization, APS Ml | Initiator added during polymerization, APS Gm | Batch Size gm of TFE | Batch Time min | Dispersion solids % | Particle size DV (50) nm | Total Undispersed Polymer gm* |
|---|---|---|---|---|---|---|---|---|---|---|---|---|---|
| B-1 | PEG 200 | 5.365 | 728.94 | 300 | 3.00 | 10.6 | 150 | 1.50 | 176 | 68.5 | 0.00 | | 994 |
| B-2 | PPG P400 | 5.294 | 716.47 | 329 | 3.29 | 27.9 | 121 | 1.21 | 110 | 60.0 | 0.00 | | 649 |
| B-3 | PEG 200 | 1.800 | 249.65 | 300 | 1.50 | 6.8 | 171 | 1.71 | 813 | 80.7 | 0.24 | 221 | 1909 |
| B-4 | PPG P400 | 1.800 | 243.57 | 330 | 3.30 | 21.8 | 59.00 | 0.59 | 473 | 27.2 | 1.00 | 282 | 2889 |

*Total Undispersed Polymer is higher than Batch Size due to entrained water

TABLE C

| Example # | Polyalkylene Oxide Name | Polyalkylene Oxide Amount gm | ppm, water | Kick-off initiator, APS KPS, ml | Kick-off initiator, APS KPS, gm | Kick-off initiator, APS NaAc | KO Time min | Initiator added during polymerization ml | Initiator added during polymerization KPS, gm | Initiator added during polymerization NaAc | Batch Size gm of TFE | Batch Time min | Dispersion solids % | Particle size DV (50) nm | Total Undispersed Polymer gm* |
|---|---|---|---|---|---|---|---|---|---|---|---|---|---|---|---|
| C-1 | PEG 200 | 5.365 | 728.94 | 300 | 3.0 | 3.0 | 8.8 | 150 | 1.50 | 1.50 | 203 | 70.0 | 0.05 | 110 | 357 |
| C-2 | PPG P400 | 5.294 | 719.20 | 300 | 3.0 | 3.0 | 20.8 | 150 | 1.50 | 1.50 | 41 | 58.0 | 0.00 | | 51 |
| C-3 | PEG 200 | 1.800 | 249.58 | 150 | 1.5 | 1.5 | 6.6 | 92 | 0.92 | 0.92 | 467 | 41.3 | 0.00 | | 1348 |
| C-4 | PPG P400 | 1.800 | 244.47 | 300 | 3.0 | 3.0 | 11.5 | 117 | 1.17 | 1.17 | 1338 | 51.4 | 1.85 | 518 | 1720 |

*Total Undispersed Polymer is higher than Batch Size due to entrained water

Example 1

PTFE Polymerized Using Various Polyalkylene Oxides as Nucleating Additive

In accordance with the invention, a series of Examples are listed in Tables D-1 and D-2 using the procedure described below. The results of these examples indicate the ability to polymerize TFE monomer to form PTFE dispersion with good solids content with low amounts of undispersed polymer (coagulum) to be discarded as waste.

To a 12 liter, horizontally disposed, jacketed, stainless steel autoclave with a two blade agitator is added 5200 gm of deionized, deaerated water and 250 gm of liquid wax (Purity® FG WO White Mineral Oil 68 manufactured by Petro-Canada Lubricants, Inc.). To the autoclave is added an additional 500 gm of deionized, deaerated water which contains the amount and type of nucleating additive as shown in Table D-1. The autoclave is sealed and evacuated. The autoclave is raised to 30 psig (310 kPa) with nitrogen followed by evacuation. This pressure and evacuation cycle is conducted a total of three times. The autoclave is then purged with TFE by raising the pressure to 30 psig (310 kPa) and venting to atmospheric pressure a total of three times. Agitator speed is set to 65 RPM and the reactor is heated to 90° C. When reactor content has reached 90° C., 30 ml of initiator solution containing the amount of ammonium persulfate (APS) shown in Table D-1 is added. Over an approximately 25 minute period, TFE is charged to the reactor to bring the reactor pressure to 400 psig (2.86 MPa). At time zero, 150 ml of an initiator solution composed of 8.167 gm of disuccinic acid peroxide, 0.167 gm of ammonium persulfate and 488.3 gm of deionized water is precharged to the reactor at a rate of 80 ml/min. After reactor pressure drops 10 psi (69 kPa) from the maximum pressure observed during injection of the initiator solution, the reaction is considered to have commenced. The time from beginning of injection of the initiator solution to commencement of polymerization is recorded as the kick-off time (KO Time) and is given in Table D-1. Autoclave pressure is brought back to 400 psig (2.86 MPa) with TFE and maintained at that pressure for the duration of the polymerization. After 100 gm of TFE has been fed since kick-off, surfactant solution containing 1.44 gm of SDS as the hydrocarbon stabilizing surfactant and 0.022 gm of iron sulfate heptahydrate per 100 gm of aqueous solution is pumped to the reactor at a rate of 4 ml/min until the end of the run or until 400 ml of solution is pumped. The delay in commencing the addition of the stabilizing surfactant to the aqueous medium corresponds to a PTFE concentration of 1.7 wt %. After 3100 gm of TFE has been added to the reactor, the time since kick-off is recorded as Batch Time (see Table D-1), the agitator is stopped, the reactor is vented to atmospheric pressure and the resulting PTFE dispersion is discharged. Upon cooling, liquid wax is separated from the PTFE dispersion and the dispersion is filtered to remove undispersed polymer. The reactor is opened and all adhered polymer removed from the reactor. Reactor cleanout is combined with the filtered undispersed polymer and dried in a vacuum oven at 110° C. with an air purge. To obtain a measure of total undispersed polymer (coagulum), liquid wax adhering to this polymer is further removed by centrifuging the polymer and blotting the polymer with paper towels. Resulting dry total undispersed polymer is given in Table D-2.

The dispersion of PTFE particles thus produced has an average particle size by volume, Dv(50), shown in Table D-2, and a solids content as shown in Table D-1. The total amount of SDS which is added to the aqueous medium during polymerization is expressed as ppm based on the weight of the PTFE produced.

Space Time Yield (STY) is a measure of reactor productivity expressed as grams of polymer produced per liter of reactor volume per hour of polymerization time. The values for SDS on polymer and for STY are given in Table D-2.

The dispersion of PTFE particles is coagulated by diluting the dispersion to about 10 wt % solids and adding about 10% by volume of a 20 wt % aqueous ammonium carbonate solution followed by vigorous agitation until the polymer fully separates from the water. The PTFE is dried in a vacuum oven at 110° C. for 12 hours. Melting point of the PTFE as measured by Differential Scanning calorimeter (DSC) on first heat is given in Table D-2.

TABLE D-1

| Example # | Nucleating additive Type | Nucleating additive Amount gm | ppm on Water | ppm on Polymer | APS Gm | KO Time Min | Batch Time min | Solids % |
|---|---|---|---|---|---|---|---|---|
| D1 | PPG P400 | 0.015 | 2.4 | 4.5 | 0.015 | 3.3 | 104.4 | 33.53 |
| D2 | PPG P1200 | 0.044 | 7.0 | 13.5 | 0.015 | 6.4 | 102.5 | 33.93 |
| D3 | PPG PT700 | 0.026 | 4.1 | 8.0 | 0.015 | 3.9 | 109.2 | 33.58 |
| D4 | PPG PT250 | 0.009 | 1.5 | 2.9 | 0.005 | 2.3 | 133.9 | 32.25 |
| D5 | PEG 600 | 0.022 | 3.5 | 6.7 | 0.005 | 4.4 | 98.9 | 33.71 |

TABLE D-1-continued

|  |  | Nucleating additive | | | | | | |
|---|---|---|---|---|---|---|---|---|
| Example # | Type | Amount gm | ppm on Water | ppm on Polymer | APS Gm | KO Time Min | Batch Time min | Solids % |
| D6 | PEG 1000 | 0.037 | 5.9 | 11.2 | 0.005 | 5.8 | 98.0 | 33.91 |
| D7 | MPEG 750 | 0.028 | 4.5 | 8.5 | 0.005 | 4.5 | 97.3 | 33.92 |
| D8 | MPEG 550 | 0.020 | 3.3 | 6.2 | 0.005 | 4.2 | 100.6 | 33.85 |
| D9 | Polyglycol P1000TB | 0.037 | 5.9 | 11.1 | 0.005 | 7.1 | 101.1 | 34.27 |
| D10 | PEG 200 | 0.007 | 1.1 | 2.1 | 0 | 3.2 | 116.1 | 34.02 |
| D11 | PEGBE | 0.008 | 1.2 | 2.3 | 0.005 | 3.8 | 119.1 | 33.82 |
| D12 | PTMEG/PTHF | 0.009 | 1.5 | 2.8 | 0.005 | 3.7 | 109.5 | 33.50 |
| D13 | PEGMA | 0.019 | 3.0 | 5.7 | 0.005 | 3.8 | 102.2 | 33.35 |
| D14 | PPGMA | 0.014 | 2.2 | 4.2 | 0.005 | 4.1 | 108.5 | 33.66 |
| D15 | PPGA | 0.018 | 2.8 | 5.3 | 0.005 | 3.9 | 108.3 | 33.27 |
| D16 | PPGDMA | 0.021 | 3.3 | 6.2 | 0.005 | 4.0 | 109.7 | 34.18 |
| D17 | DMPEG | 0.009 | 1.5 | 2.8 | 0.005 | 3.4 | 119.0 | 33.33 |

TABLE D-2

| Example # | Type | SDS on polymer ppm | Dv (50) nm | # of Particles | Undispersed Polymer gm/wt % | Polymer Made gm | STY gm/ (L-hr) | DSC 1st Melt ° C. |
|---|---|---|---|---|---|---|---|---|
| D1 | PPG P400 | 1715 | 382 | 5.272E+16 | 199/5.7 | 3324 | 149.6 | 337.5 |
| D2 | PPG P1200 | 1689 | 259 | 1.660E+17 | 62/1.9 | 3262 | 156.1 | 337.1 |
| D3 | PPG PT700 | 1779 | 268 | 1.486E+17 | 66/2.0 | 3235 | 145.1 | 337.5 |
| D4 | PPG PT250 | 1792 | 353 | 6.455E+16 | 285/8.1 | 3211 | 109.3 | 337.7 |
| D5 | PEG 600 | 1648 | 251 | 1.840E+17 | 63/1.9 | 3292 | 163.2 | 337.5 |
| D6 | PEG 1000 | 1605 | 252 | 1.823E+17 | 72/2.2 | 3300 | 164.7 | 337.5 |
| D7 | MPEG 750 | 1603 | 253 | 1.798E+17 | 61/1.9 | 3294 | 166.1 | 337.1 |
| D8 | MPEG 550 | 1673 | 275 | 1.390E+17 | 88/2.7 | 3269 | 158.1 | 337.4 |
| D9 | Polyglycol P1000TB | 1636 | 255 | 1.773E+17 | 56/1.7 | 3326 | 161.7 | 336.9 |
| D10 | PEG 200 | 1743 | 337 | 7.659E+16 | 106/3.2 | 3315 | 138.2 | 338.2 |
| D11 | PEGBE | 1760 | 258 | 1.684E+17 | 60/1.8 | 3271 | 134.8 | 337.7 |
| D12 | PTMEG/PTHF | 1753 | 317 | 9.114E+16 | 120/3.6 | 3284 | 144.5 | 337.3 |
| D13 | PEGMA | 1697 | 271 | 1.454E+17 | 94/2.9 | 3272 | 155.5 | 337.2 |
| D14 | PPGMA | 1741 | 337 | 7.637E+16 | 112/3.4 | 3306 | 147.2 | 337.3 |
| D15 | PPGA | 1745 | 325 | 8.494E+16 | 109/3.3 | 3298 | 147.2 | 337.0 |
| D16 | PPGDMA | 1715 | 331 | 8.184E+16 | 110/3.3 | 3357 | 148.0 | 336.9 |
| D17 | DMPEG | 1748 | 394 | 4.761E+16 | 179/5.4 | 3294 | 130.9 | 337.2 |

Example 2

PFA Polymerized Using PEG 600 as Nucleating Additive

To a 12 liter, horizontally disposed, jacketed, stainless steel autoclave with a two blade agitator is added 6500 gm of deionized, deaerated water. To the autoclave is added an additional 500 gm of deionized, deaerated water which contains 0.0054 gm of Polyethylene Glycol 600 (Sigma Aldrich) and 0.3 gm of sodium sulfite. The autoclave is sealed and placed under vacuum. The autoclave is raised to 30 psig (310 kPa) with nitrogen and then evacuated. The autoclave is pressured with nitrogen and evacuated two more times. Agitation is begun and the agitator speed is set to 70 RPM. 165 ml of PPVE and 0.1 gm of ethane is added to the reactor. 5 ml of initiator solution containing 4.0 gm of ammonium persulfate (APS) per liter of water is added to the reactor. The reactor is heated to 80° C. and then over an approximately 25 minute period 545 gm of TFE is charged to the reactor to bring the reactor pressure to 400 psig (2.86 MPa). At time zero, 20 ml of an initiator solution containing 4.0 gm of ammonium persulfate (APS) per liter of water is charged to the reactor at 60 ml/min and then the initiator is pumped continuously at 1 ml/min until the end of the run. Kick-off occurs after 1.5 minutes from the start of initiator injection when the reactor pressure drops 10 psig (69 kPa) from the maximum pressure observed during injection of the initiator solution. Autoclave pressure is brought back to 400 psig (2.86 MPa) with TFE and maintained at that pressure for the duration of the polymerization. After 400 gm of TFE has been fed since kick-off, surfactant solution containing 1.0 gm of sodium dodecyl sulfate (SDS) and 0.2 gm of sodium sulfite per 100 gm of deionized, deaerated water as the stabilizing surfactant is pumped to the reactor at a rate of 0.4 ml/min (0.02 gm/l-hr of SDS) until 700 gm of TFE fed since kick-off, then at a rate of 0.7 ml/min (0.035 gm/1-hr SDS) until 950 gm of TFE fed since kick-off, then at a rate of 1.0 ml/min (0.05 gm/1-hr SDS) until 1400 gm of TFE fed since kick-off, then at a rate of 1.3 ml/min (0.065 gm/1-hr SDS) until 1900 gm of TFE fed since kick-off, then at a rate of 1.6 ml/min (0.08 gm/1-hr SDS) until 2400 gm of TFE fed since kick-off, and then at a rate of 1.9 ml/min (0.095 gm/l-hr SDS) until the end of the run. The delay in commencing the addition of stabilizing surfactant to the aqueous medium corresponds to 5.4 wt % concentration of PFA in the aqueous medium. The time delay is 16 min. After 149 minutes since kick-off, 2500 gm of TFE and 162 ml of surfactant solution have been added to the reactor. The agitator is stopped, the reactor is vented to atmospheric pressure and the dispersion is discharged. 9.7 Kg of aqueous dispersion is produced with 26.3 wt % solids content in the aqueous medium and 154 nm raw dispersion particle size. Undispersed polymer obtained from filtering the dispersion through cheesecloth and from cleaning the reactor is dried in a vacuum oven and measures 315 gm (12 wt %). PFA polymer is isolated by freezing a dispersion sample followed by thawing, filtration, washing and drying. The polymer contains 4.3 wt % PPVE as measured by FTIR and has a MFR of 7.9 gm/10 min. Space Time Yield (STY) is 85.8 g/l-hr.

Example 3

PFA Polymerized Using PPG P400 as Nucleating Additive

PFA is produced under the same conditions as in Example 2 above except that the 500 gm of deaerated water contains 0.0036 gm of Polypropylene Glycol P400 (Sigma Aldrich) and 0.3 gm of sodium sulfite as the nucleating additive. Kick-off time is 2.6 minutes, batch time is 143 minutes and 156 ml of surfactant solution is added to the reactor. 9.6 kg of aqueous dispersion is produced with 26.7 wt % solids content and 151 nm raw dispersion particle size. Undispersed polymer obtained from filtering the dispersion through cheesecloth and from cleaning the reactor is dried in a vacuum oven and measures 394 gm. The isolated polymer contains 4.3 wt % PPVE as measured by FTIR and has a MFR of 9.3 gm/10 min. The delay in commencing the addition of the stabilizing surfactant to the aqueous medium corresponds to a PFA concentration of 5.4 wt %. Space Time Yield (STY) is 89.7 g/l-hr.

Example 4

PTFE Polymerized with a Blend of Polyalkylene Oxides as Nucleating Additive

To a 12 liter, horizontally disposed, jacketed, stainless steel autoclave with a two blade agitator is added 5200 gm of deionized, deaerated water and 250 gm of Purity FG mineral oil 68, a liquid wax. To the autoclave is added an additional 500 gm of deionized, deaerated water which contains 0.120 gm of Polypropylene Glycol P400 (Sigma Aldrich) and 0.03 gm of Polypropylene Glycol P1200 (Sigma Aldrich). The Surface Tension of this blend of surfactants is 45.60 (4:1 ratio in water at a concentration for the blend of 1000 ppm). The autoclave is sealed and placed under vacuum. The autoclave is raised to 30 psig (310 kPa) with nitrogen and evacuated. This pressure and evacuation cycle is conducted a total of three times. The autoclave is then purged with TFE by raising the pressure to 30 psig (310 kPa) and venting to atmospheric pressure a total of three times. The agitator speed is set to 65 RPM and the reactor is heated to 90° C. 120 ml of initiator solution containing 1.0 gm of ammonium persulfate (APS) per liter of water is added to the reactor. Over a period of approximately 25 minutes, 628 gm of TFE is charged to the reactor to bring the reactor pressure to 400 psig (2.86 MPa). At time zero, 150 ml of an initiator solution composed of 8.167 gm of disuccinic acid peroxide, 0.167 gm of ammonium persulfate and 488.3 gm of deionized water is charged to the reactor at 80 ml/min. After 5.1 minutes from the start of initiator injection the reactor pressure drops 10 psi (69 kPa) from the maximum pressure observed during injection of the initiator solution which is recorded as the kick-off time. Autoclave pressure is brought back to 400 psig (2.86 MPa) with TFE and maintained at that pressure for the duration of the polymerization. After 100 gm of TFE has been fed since kick-off, surfactant solution containing 1.44 gm of SDS as the hydrocarbon stabilizing surfactant and 0.022 gm of iron sulfate heptahydrate per 100 gm of water is pumped to the reactor at a rate of 4 ml/min until 400 ml of solution is pumped. The delay in commencing the addition of the stabilizing surfactant to the aqueous medium corresponds to a PTFE concentration of 1.7 wt %. After 119 minutes since kick-off, 3100 gm of TFE has been added to the reactor. The agitator is stopped, the reactor is vented to atmospheric pressure and the resulting PTFE dispersion is discharged. Upon cooling, liquid wax is separated from the dispersion and the dispersion is filtered to remove undispersed polymer. The reactor is opened and all adhered polymer removed from the reactor. Reactor cleanout is combined with the filtered undispersed polymer and dried in a vacuum oven at 110° C. with an air purge. To obtain a measure of total undispersed polymer (coagulum) liquid wax adhering to this polymer is further removed by centrifuging the polymer and blotting the polymer with paper towels. Total coagulum is thus determined to be 17.9 gm. Total recovered liquid wax is 181.6 gm. 3346 gm of dispersed PTFE particles, providing a solids content in the aqueous medium of 34.28% and an average particle size by volume, Dv(50), of 176 nm. The total amount of SDS added to the aqueous medium is 1720 ppm based on the weight of the PTFE particles. Space Time Yield (STY) is 140.7 g/l-hr. The dispersion of PTFE particles is coagulated by diluting the dispersion to about 10 wt % solids and adding 10 ml of 20% aqueous ammonium carbonate solution followed by vigorous agitation until the polymer fully separates from the water. The PTFE is dried in a vacuum oven at 110° C. for 12 hours. Melting point of the PTFE as measured by Differential Scanning calorimeter (DSC) on first heat is 336.3° C.

Example 5

PTFE Polymerized Using Polyalkylene Oxide and Nonionic Surfactant as Nucleating Additive To a 12 liter, horizontally disposed, jacketed, stainless steel autoclave with a two blade agitator is added 5200 gm of deionized, deaerated water and 250 gm of Purity FG mineral oil 68, a liquid wax. To the autoclave is added an additional 500 gm of deionized, deaerated water which contains 0.120 gm of Polypropylene Glycol P400 and 0.02 gm of the branched secondary alcohol ethoxylate nonionic surfactant sold by Dow Chemical as Tergitol™ TMN-6 (described previously under Stabilizing Surfactants). The autoclave is sealed and placed under vacuum. The autoclave is raised to 30 psig (310 kPa) with nitrogen and evacuated. This pressure and evacuation cycle is conducted a total of three times. The autoclave is then purged with TFE by raising the pressure to 30 psig (310 kPa) and venting to atmospheric pressure a total of three times. The agitator speed is set to 65 RPM and the reactor is heated to 90° C. 210 ml of initiator solution containing 1.0 gm of ammonium persulfate (APS) per liter of water is added to the reactor. Over a period of approximately 25 minutes, 642 gm of TFE is charged to the reactor to bring the reactor pressure to 400 psig (2.86 MPa). At time zero, 150 ml of an initiator solution composed of 8.167 gm of disuccinic acid peroxide, 0.167 gm of ammonium persulfate and 488.3 gm of deionized water is precharged to the reactor at 80 ml/min. After 4.1 minutes from the start of initiator injection the reactor pressure drops 10 psi (69 kPa) from the maximum pressure observed during injection of the initiator solution which is recorded as the kick-off time. Autoclave pressure is brought back to 400 psig (2.86 MPa) with TFE and maintained at that pressure for the duration of the polymerization. After 100 gm of TFE has been fed since kick-off, surfactant solution containing 1.44 gm of SDS as the hydrocarbon stabilizing surfactant and 0.022 gm of iron sulfate heptahydrate per 100 gm of water is pumped to the reactor at a rate of 4 ml/min until 400 ml of solution is pumped. The delay in commencing the addition of the stabilizing surfactant to the aqueous medium corresponds to a PTFE concentration of 1.7 wt %. After 110 minutes since kick-off, 3100 gm of TFE has been added to the reactor. The agitator is stopped, the reactor is vented to atmospheric pressure and the resulting PTFE dispersion is discharged. Upon cooling, liquid wax is separated from the dispersion and the dispersion is filtered to remove undispersed polymer. The reactor is opened and all adhered polymer removed from the reactor. Reactor cleanout is combined with the filtered undispersed polymer and dried in a vacuum oven at 110° C. with an air purge. To obtain a measure of total undispersed polymer (coagulum), liquid wax adhering to this polymer is further removed by centrifuging the polymer and blotting the polymer with paper towels. Total coagulum is thus determined to be 22.0 gm. Total recovered liquid wax is 191.6 gm. 3279 gm of dispersed PTFE particles, providing a solids content in the aqueous medium of 33.63% and an average particle size by volume, Dv(50), of 169 nm. The total amount of SDS added to the aqueous medium is 1745 ppm based on the weight of the PTFE particles. Space Time Yield (STY) is 148.6 g/l-hr. The dispersion of PTFE particles is coagulated by diluting the dispersion to about 10 wt % solids and adding 10 ml of 20% aqueous ammonium carbonate solution followed by vigorous agitation until the polymer fully separates from the water. The PTFE is dried in a vacuum oven at 110° C. for 12 hours. Melting point of the PTFE as measured by Differential Scanning calorimeter (DSC) on first heat is 336.6° C.

What is claimed is:

1. Process for polymerizing fluoromonomer to form an aqueous dispersion of fluoropolymer particles comprising:
   (a) providing an aqueous medium in a polymerization reactor,
   (b) adding nucleating additive comprising polyalkylene oxide having a number average molecular weight of about 50 to about 2000 to said aqueous medium in an amount of about 0.1 ppm to about 50 ppm based on water in said aqueous medium, wherein said polyalkylene oxide has a surface tension in water of greater than 40 dynes/cm at a concentration of 1000 ppm,
   (c) exposing said nucleating additive to oxidizing agent to form a dispersion of oleophilic nucleation sites in said aqueous medium;
   (d) pressurizing said reactor by adding fluoromonomer, and
   (e) adding polymerization initiator to said aqueous medium to cause said polymerizing of said fluoromonomer to form fluoropolymer particles dispersed in said aqueous medium.

2. The process of claim 1 wherein said nucleating additive has a number average molecular weight of about 100 to about 1500.

3. The process of claim 1 wherein said nucleating additive is a compound of the formula:

$$X-[O-R_1]_n-O-Y$$

wherein $R_1$ is a branched or unbranched alkylene group having 1-4 carbon atoms; X and Y are independently selected from hydrogen, alkyl having 1 to 5 carbon atoms, acrylate, and methacrylate; and n is 1 to 50.

4. The process of claim 1 wherein said process produces a dispersion of perfluoropolymer particles.

5. The process of claim 4 wherein said perfluoropolymer of said perfluoropolymer particles is selected from the group consisting of polytetrafluoroethylene, modified polytetrafluoroethyene, and melt-fabricable copolymer comprising 40-99 mol % tetrafluoroethylene units and 1-60 mol % of at least one other fluoromonomer.

6. The process of claim 1 further comprising adding water-soluble inorganic salt to said aqueous medium prior to or during said exposing of said nucleating additive to oxidizing agent.

7. The process of claim 6 wherein said water-soluble inorganic salt is selected from sodium sulfite and ammonium sulfite.

8. The process of claim 1 wherein said nucleating additive further comprises hydrocarbon-containing surfactant in an amount of about 0.1 ppm to about 50 ppm based on water in said aqueous medium.

9. The process of claim 8 wherein said hydrocarbon-containing surfactant is hydrocarbon surfactant.

10. The process of claim 1 further comprising adding stabilizing surfactant to said aqueous medium to stabilize said dispersion of fluoropolymer particles.

11. The process of claim 10 wherein said stabilizing surfactant is hydrocarbon-containing surfactant.

12. The process of claim 11 wherein said stabilizing surfactant is hydrocarbon surfactant.

13. The process of claim 11 wherein the adding of stabilizing surfactant is delayed until after polymerizing has commenced.

14. The process of claim 13 wherein the adding of stabilizing surfactant is delayed until after the concentration of said fluoropolymer particles in said aqueous medium is at least about 0.6 wt %.

15. The process of claim 11 wherein said stabilizing surfactant is added over time as polymerizing is carried out.

16. The process of claim 1 wherein no halogen-containing surfactant is added to the aqueous medium.

17. The process of claim 1 wherein said oxidizing agent is polymerization initiator.

* * * * *